(12) United States Patent
Kuramori

(10) Patent No.: US 7,878,601 B2
(45) Date of Patent: Feb. 1, 2011

(54) TIRE WHEEL SET AND VEHICLE HAVING THE SAME

(75) Inventor: Akira Kuramori, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/348,708

(22) Filed: Jan. 5, 2009

(65) Prior Publication Data
US 2009/0160242 A1 Jun. 25, 2009

Related U.S. Application Data

(62) Division of application No. 10/523,259, filed as application No. PCT/JP03/10445 on Aug. 19, 2003, now abandoned.

(30) Foreign Application Priority Data
Aug. 23, 2002 (JP) ............................. 2002-244144

(51) Int. Cl.
*B60B 3/10* (2006.01)
(52) U.S. Cl. ..................... 301/63.101; 301/65
(58) Field of Classification Search ............ 301/63.101, 301/63.106, 64.101, 64.102, 65
See application file for complete search history.

(56) References Cited
U.S. PATENT DOCUMENTS
2001/0048241 A1  12/2001  Yoshimura

FOREIGN PATENT DOCUMENTS

| JP | 2-71084 | * | 5/1990 | .................. 301/65 |
|---|---|---|---|---|
| JP | 2-71084 U | | 5/1990 | |
| JP | U 3-7001 | | 1/1991 | |
| JP | A 10-236101 | | 9/1998 | |
| JP | 2606530 Y2 | | 9/2000 | |
| JP | A 2001-259769 | | 9/2001 | |
| JP | A 2001-301402 | | 10/2001 | |
| JP | A 2002-87003 | | 3/2002 | |

OTHER PUBLICATIONS

Marshall Brain, "How Champ Cars Work", printed off internet Jul. 13, 2009, pp. 1-7 (specifically p. 3 and 6).*
Machine translation of JP 2-71084.*
Takaaki Uno, "Sharyo Undo Seino to Chassis Mechanism," Kabushiki Kaisha Guranpuri Shuppan, Sep. 10, 1994, pp. 68 to 70.

* cited by examiner

*Primary Examiner*—Jason R Bellinger
(74) *Attorney, Agent, or Firm*—Greer, Burns & Crain, Ltd.

(57) ABSTRACT

A tire wheel set comprising a front wheel to be attached to a front axle of a vehicle, and a rear wheel to be attached to a rear axle thereof. The front wheel is greater in rigidity than the rear wheel.

6 Claims, 4 Drawing Sheets

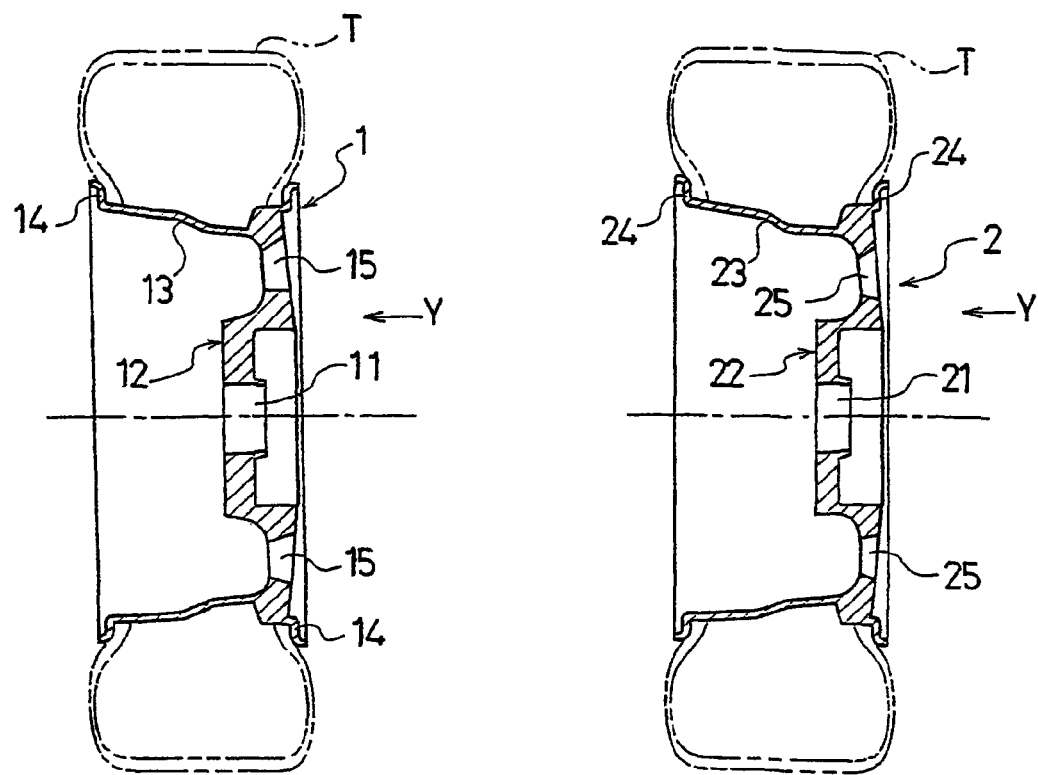
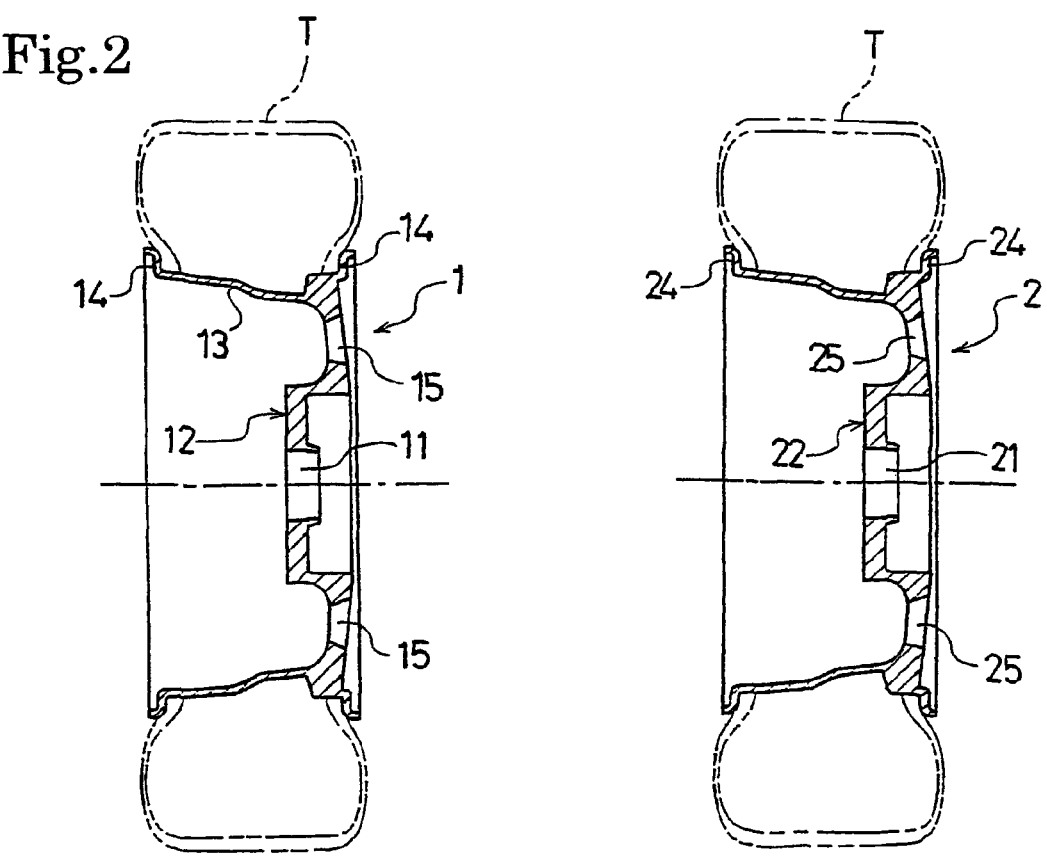

Fig.3
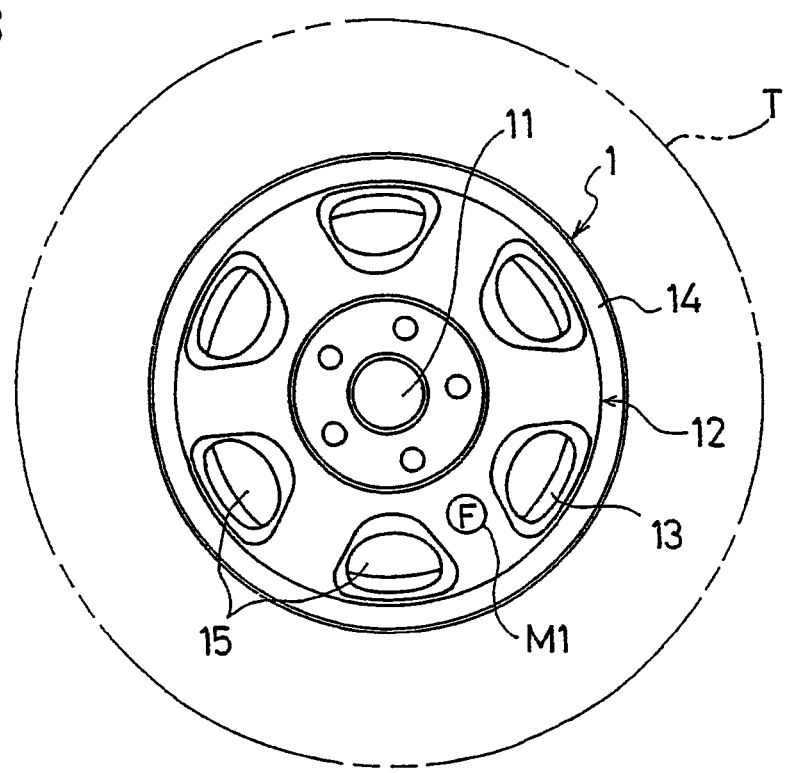
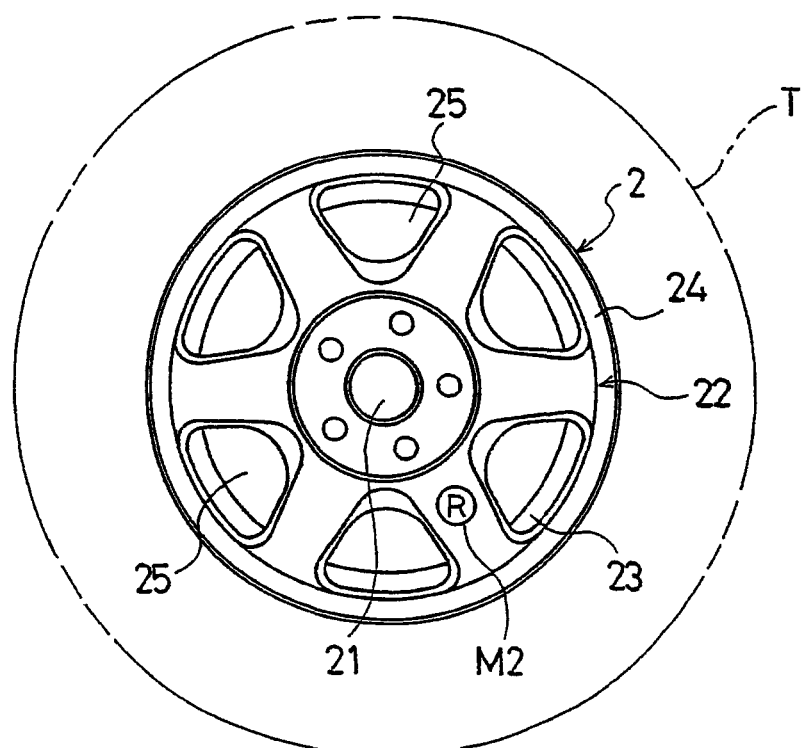

TIRE WHEEL SET AND VEHICLE HAVING THE SAME

This application is a Division of application Ser. No. 10/523,259, filed Jan. 27, 2005, which is a U.S. National stage under 371 of PCT/JP2003/010445, filed Aug. 19, 2003.

TECHNICAL FIELD

The present invention relates to a tire wheel set and a vehicle having the tire wheel set, and more particularly, to a tire wheel set and a vehicle having the tire wheel set, which can improve steering stability.

TECHNICAL BACKGROUND

In order to improve traveling performance of vehicles, it is desired to ensure a higher steering stability, and various approaches have been taken to improve steering stability. Pneumatic tires, for example, have sidewalls which are high in rigidity, thus reducing an amount of deflection of the tire to thereby improve steering stability.

However, the conventional approaches including that of tires have their limits, and new techniques are desired to improve steering stability.

DISCLOSURE OF THE INVENTION

An object of the present invention is to provide a tire wheel set and a vehicle having the tire wheel set capable of improving steering stability of the vehicle.

In order to achieve the above object, a tire wheel set according to the present invention includes a front wheel to be attached to a front axle of a vehicle and a rear wheel to be attached to a rear axle thereof, the front wheel being greater in rigidity than the rear wheel.

A vehicle according to the present invention has the tire wheel set mentioned above.

The steering stability of a vehicle is greatly affected by the steering wheels thereof. In view of this, according to the tire wheel set of the present invention described above, the front wheel used for the steering wheel is higher in rigidity than the rear wheel, and therefore, the rigidity difference therebetween can improve vibration convergence property of the front wheel. Thus, vibration transmitted to the front wheel from the front tire can be attenuated faster to thereby allow steering stability to be improved.

BRIEF DESCRIPTION OF THE DRAWINGS

FIG. 1 is a cross-sectional view showing an embodiment of a tire wheel set according to the present invention.

FIG. 2 is a cross-sectional view showing an alternative embodiment of a tire wheel set according to the present invention.

FIG. 3 is a cross-sectional view showing another alternative embodiment of a tire wheel set according to the present invention.

BEST MODES FOR CARRYING OUT THE INVENTION

Figure 4:
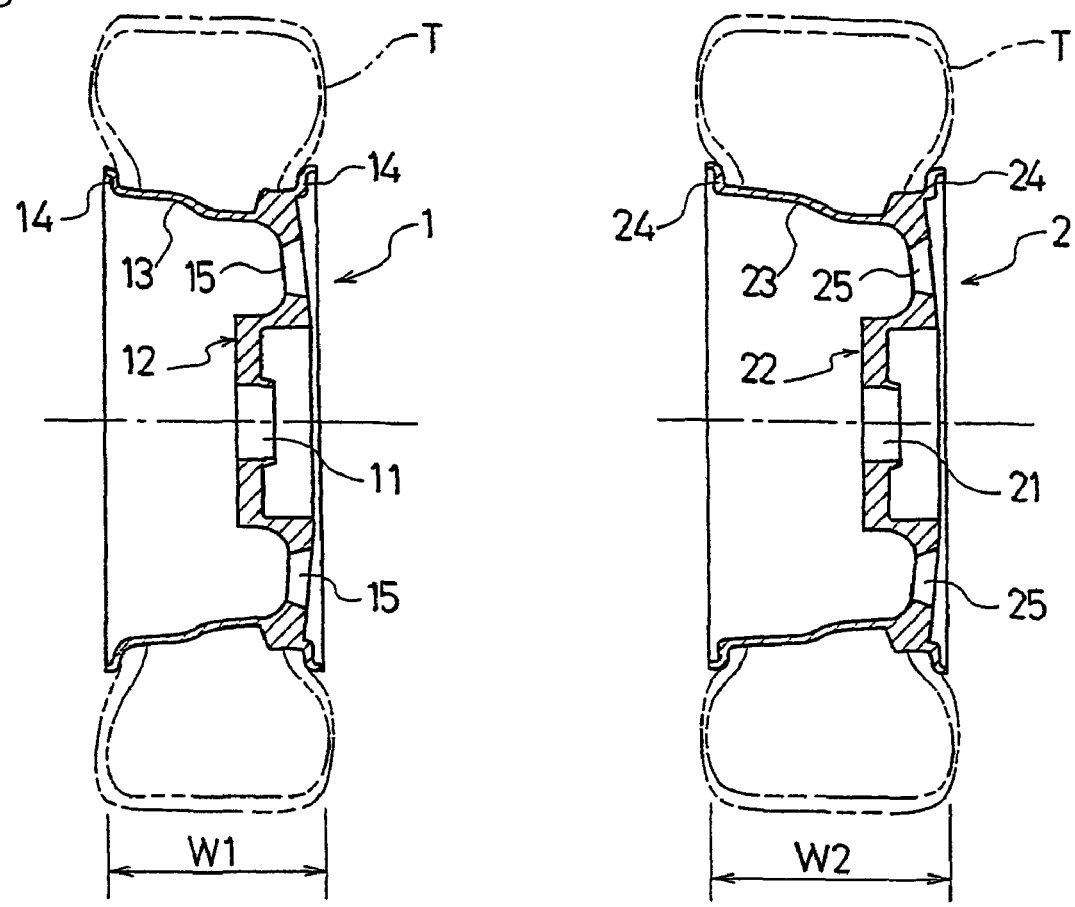
FIG. 4 is a cross-sectional view showing still another alternative embodiment of a tire wheel set according to the present invention.

The embodiments of the present invention will be described in detail below with reference to the drawings.

FIG. 1 shows an embodiment of a tire wheel set according to the present invention. The tire wheel set includes two front wheels 1 to be attached to the front axle of a vehicle, and two rear wheels to be attached to the rear axle thereof. In the drawing, one front wheel 1 and one rear wheel 2 are shown, and the other wheels 1 and 2 are omitted, due to the same construction. The drawings described below are the same.

Each of the front wheels 1 comprises a disk 12 centrally having an attachment hole 11 for receiving the axle, and an annular rim 13 provided on the peripheral edge of the disk 12, and the rim 13 has annular flange portions 14 provided on both sides thereof.

The disk 12 has triangular openings 15, in a front view viewing in the direction of an arrow Y, surrounding the attachment hole 11 in a predetermined interval along the circumferential direction of the disk, and the triangular openings 15 forms a design portion for aesthetic purposes to the wheel 1.

Each of the rear wheels 2 also comprises a disk 22 centrally having an attachment hole 21 for receiving the axle, and an annular rim 23 provided on the peripheral edge of the disk 12, and the rim 23 has annular flange portions 24 provided on both sides thereof.

The disk 22 also has triangular openings 25, in a front view viewing in the direction of an arrow Y, surrounding the attachment hole 21 in a predetermined interval along the circumferential direction of the disk, and the triangular openings 25 forms a design portion for aesthetic purposes to the wheel 2.

The disk 12 of each front wheel 1 is greater in thickness than the disk 22 of each rear wheel 2, and the front wheels 1 are higher in rigidity than the rear wheels 2. In the drawing, reference character T denotes a tire mounted on each of the wheels 1 and 2.

The rest of each wheel 1 has the same thickness as that of each wheel 2 in this embodiment. However, the rim 13 of each front wheel 1 may also be thicker than the rim 23 of each rear wheel 2, or only the rim 13 may be thicker than the rim 23, thereby increasing rigidity of each front wheel 1.

FIG. 2 shows an alternative embodiment of a tire wheel set according to the present invention. In this tire wheel set, the front wheels 1 and rear wheels 2 are the same in thickness with regard to respective corresponding parts. The front wheels 1 are, however, higher in rigidity than the rear wheels 2 by forming the front wheels 1 of a material higher in rigidity than that of the rear wheels 2.

Preferably, the material of the front wheels 1 includes, for example, an alloy of magnesium, and the material of the rear wheels 2 includes, for example, an alloy of aluminum.

FIG. 3 shows another alternative embodiment of a tire wheel set according to the present invention. In this tire wheel set, the openings (design portion) 15 of the front wheels 1 are smaller than the openings (design portion) 25 of the rear wheels 2, whereby the disk 12 of each front wheel 1 is greater in rigidity than the disk 22 of each rear wheel 2 to thereby make the front wheels 1 higher in rigidity than the rear wheels 2.

The shape (design) of the openings 15 and 25 is not limited to the embodiment shown in FIG. 3, and any shape which can change the size of the openings 15 and 25 so that the front wheel 1 is greater in rigidity than the rear wheel 2 may be employed.

In the alternative of the openings 15 and 25, a design portion which is convex or concave in shape may be provided on the surface of each of the disks 12 and 22 so that the front wheel 1 is higher in rigidity than the rear wheel 2 with the design portion of the disk 12 being different in design from that of the disk 22.

In the embodiment shown in FIG. 3, the disks 12 and 22 have the design portions, and in addition or alternatively, the rims 13 and 23 may have design portions in the same manner as described above.

FIG. 4 shows still another alternative embodiment of a tire wheel set according to the present invention. In this tire wheel set, the rim width W1 of the front wheels 1 is smaller than the rim width W2 of the rear wheels 2, whereby the front wheels 1 are greater in rigidity than the rear wheels 2. The front wheels 1 and rear wheels 2 are the same in size and in thickness with regard to respective corresponding parts.

In the case that the rim widths W1 and W2 of the front wheels 1 and rear wheels 2 are different as mentioned above, it is preferable that the difference between nominal rim widths thereof be ½ or 0.5 (a wheel which is ½ (0.5) to 2 less in nominal rim width than the rear wheel 2 is used for the front wheel 1). Note that the difference between nominal rim widths, referred herein, is a difference between numerical values, without alphabets, of nominal rim widths written in JATMA YEAR BOOK 2001. If the difference between nominal rim widths is less than ½ or 0.5, it is difficult to effectively make the rigidity of the front wheel 1 higher than that of the rear wheel 2. If the difference between nominal rim widths is greater than 2, ride comfort is deteriorated.

Figure 5:
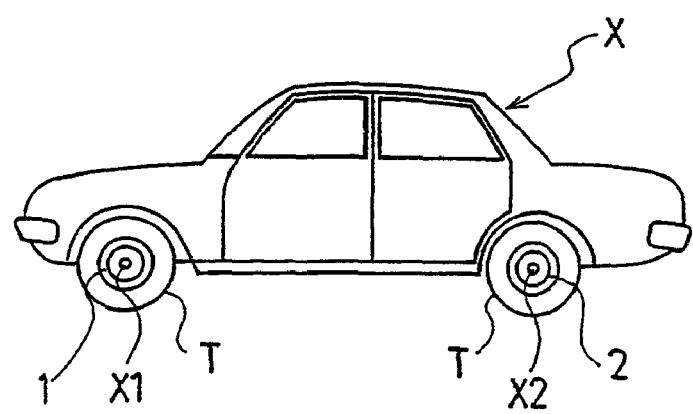
FIG. 5 is a side view showing a vehicle having the tire wheel set of the present invention.

FIG. 5 shows a vehicle having a tire wheel set according to the invention, and front wheels 1 and rear wheels 2 on which tires T are mounted are attached to the front axle X1 and rear axle X2 of a vehicle X, respectively.

The steering wheels of the vehicle X greatly affect steering stability thereof. According to the present invention described above, the front wheels 1 used for the steering wheels are higher in rigidity than the rear wheels 2 to thereby have a difference of rigidity between the wheels 1 and 2, thus allowing the vibration convergence property of the front wheels 1 to be improved. The vibration transmitted to the front wheels 1 from the front tires can therefore be attenuated faster, thereby allowing steerage of the front wheels 1 to be enhanced. Accordingly, steering stability can be improved.

In the present invention, the rigidity of the above-mentioned front wheels 1 may be 10% to 60% higher than that of the rear wheels 2. If the value is less than 10%, it is difficult to effectively improve steering stability, especially steerage. If the value is greater than 60%, deterioration of ride comfort is suffered.

It is desirable to provide identification marks M1 and M2 on the respective surfaces of the disks 12 and 22 of the front wheels 1 and rear wheels 2, as shown in FIG. 3, in order to facilitate differentiating the front wheels 1 from the rear wheels 2. However, it is not necessary to provide identification marks on both wheels 1 and 2 to identify them, but at least one of the front and rear wheels 1 and 2 may have an identification mark.

The front wheels 1 and the rear wheels 2 may be equal or different in size.

The constructions shown in the embodiments of FIGS. 1 to 4 may be properly combined to make the front wheels 1 higher in rigidity than the rear wheels 2.

Figure 6:
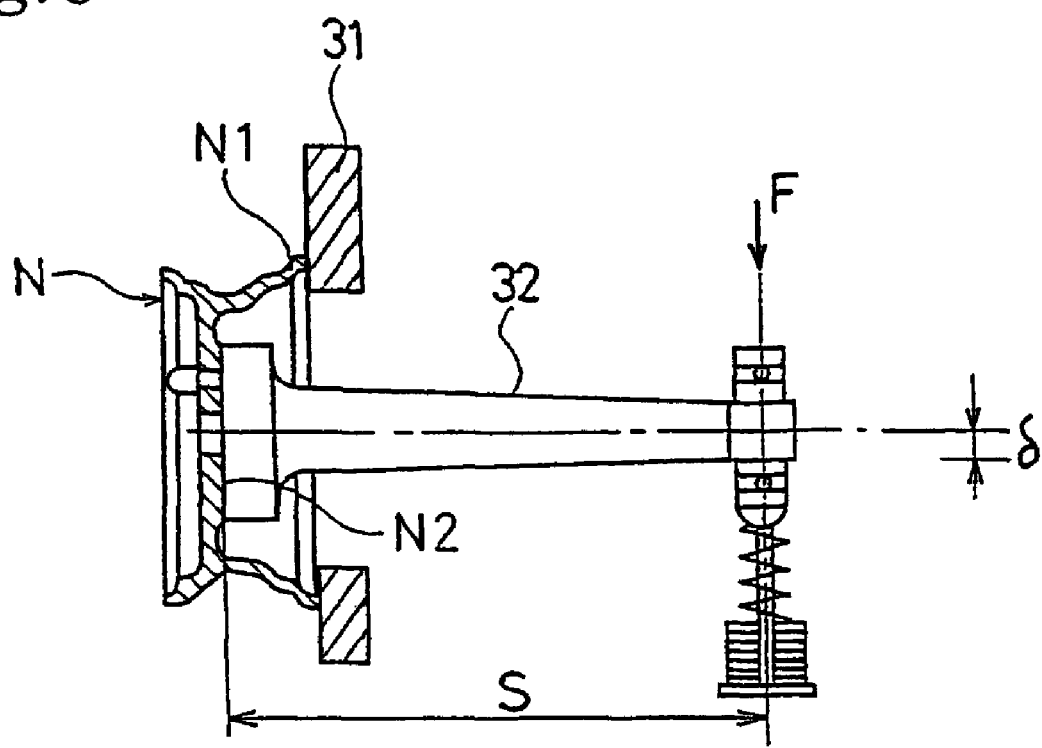
FIG. 6 is an explanatory drawing showing a method of measuring rigidity of a wheel.

The rigidity of the wheels of the present invention is determined as follows. As shown in FIG. 6, the rim flange N1 of a wheel N is securely attached to a stationary member 31, and a load arm 32 which is higher in rigidity than the wheel N is fastened to the disk surface N2 thereof. A force F is applied to the tip portion of the load arm 32, and an angular movement δ (rad) of the load arm 32 is then measured. The rigidity of the wheel N is determined in the following expression, wherein S is a distance (m) between the disk surface N2 and a location of the tip portion to which the force F is applied.

Wheel Rigidity K (kN·m/rad)=$FS^2/\delta$

The present invention is preferably applicable to a tire wheel set used for passenger cars, and more particularly, to a tire wheel set used for rear-wheel-drive vehicles.

EXAMPLE

Prepared were present invention sets 1 to 6 and comparative sets 1 to 5, each set having two front wheels and two rear wheels the rigidity values of which were shown in Table 1, and a conventional set having front and rear wheels with the same rigidity, each wheel having the same rim size of 16×6JJ. The rigidity values shown in Table 1 were indicated by an index number, with the rigidity values of the conventional front and rear wheels being 100.

The present invention set 1 was structured, as shown in FIG. 1, so that the disks of the front wheels were greater in thickness than those of the rear wheels, and the comparative set 1 had front wheels and rear wheels structured opposite to the present invention set 1.

The present invention set 2 was structured, as shown in FIG. 2, so that the front wheels were formed of an alloy of magnesium and the rear wheels were formed of an alloy of aluminum, and the comparative set 2 had front wheels and rear wheels structured opposite to the present invention set 2.

The present invention set 3 was structured, as shown in FIG. 3, so that the openings of the front wheels were smaller in size than those of the rear wheels, and the comparative set 3 had front wheels and rear wheels structured opposite to the present invention set 3.

The present invention set 4 was structured, as shown in FIG. 4, so that the nominal rim width of the front wheels were 2 less than that of the rear wheels, and the comparative set 4 had front wheels and rear wheels structured opposite to the present invention set 4.

The present invention set 5 was structured so that the front and rear wheels had the same disk design, and the same rim and disk thickness. The nominal rim width of the front wheels was ½ less than that of the rear wheels.

The present invention set 6 was structured so that only the rim thickness of the front wheels was greater than that of the rear wheels, and the design and thickness of the disks of the front and rear wheels were the same.

The comparative set 5 had front wheels and rear wheels structured opposite to the present invention set 6.

Tires having a tire size of 205/55R16 were mounted on respective wheels of the test wheel sets, an air pressure of 210 kPa was applied thereto, and each set was attached to a rear-wheel-drive passenger car with a displacement of 2.5 liters. An evaluation test for steering stability was conducted in accordance with the following measurement method. The results shown in Table 1 were obtained.

Steering Stability

A feeling test was conducted by five test drivers in a test course in such a manner that one test driver rides on and drive the passenger. Each result of the feeling test was evaluated by 5-point method, and each mark was an average value of the results of the five test drivers. The greater the value, the better the steering stability, especially steerage.

TABLE 1

| | Front Wheel Rigidity Index Number | Rear Wheel Rigidity Index Number | Steering Stability |
|---|---|---|---|
| Conventional Set | 100 | 100 | 3 |
| Present Invention Set 1 | 120 | 100 | 3.5 |
| Comparative Set 1 | 100 | 120 | 2.5 |
| Present Invention Set 2 | 160 | 100 | 4 |
| Comparative Set 2 | 100 | 160 | 2 |
| Present Invention Set 3 | 120 | 100 | 3.5 |
| Comparative Set 3 | 100 | 120 | 2.5 |
| Present Invention Set 4 | 115 | 100 | 3.5 |
| Comparative Set 4 | 100 | 115 | 2.5 |
| Present Invention Set 5 | 110 | 100 | 3.5 |
| Present Invention Set 6 | 110 | 100 | 3.5 |
| Comparative Set 5 | 100 | 110 | 2.5 |

As can be seen from Table 1, the tire wheel sets of the present invention can improve steering stability.

As illustrated above, according to the tire wheel set of the present invention, the front wheel used for a steering wheel is greater in rigidity than the rear wheel to thereby allow the vibration convergence property of the front wheel to be improved, and therefore, steering stability, particularly steerage, can be improved.

INDUSTRIAL APPLICABILITY

The present invention having the aforementioned excellent effect is very effectively applicable to a tire wheel set to be attached to a vehicle.

What is claimed is:

1. A tire wheel set having a front wheel to be attached to a front axle of a vehicle and a rear wheel to be attached to a rear axle thereof,
    wherein the front wheel is greater in rigidity than the rear wheel,
    wherein the front wheel has a rim width that is less than a rim width of the rear wheel, wherein rim width is defined as the maximum axial dimension of an associated rim, and
    wherein the rigidity is defined by the formula:

$K=FS^2/\delta$, where "K" represents rigidity, "F" represents a force applied to a tip portion of a load arm of a stationary member upon which a wheel being tested is attached, "S" represents a distance between a portion of the rim where the stationary member is attached and the tip portion to which the force F is applied, and $\delta$ is the measured angular movement of the load arm.

2. The tire wheel set according to claim 1, wherein the front wheel and the rear wheel each comprise the following components:
    a disk;
    a rim provided on the outer peripheral edge of the disk; and
    an annular flange provided on each side of said rim,
    wherein said disk, said rim and said annular flanges of said front wheel are the same thicknesses, respectively, as said disk, said rim and said annular flanges of said rear wheel, and
    said disk and said annular flanges of said front wheel are the same sizes, respectively, as said disk and said annular flanges of said rear wheel.

3. The tire wheel set according to claim 2, wherein a difference between nominal rim widths of the front wheel and rear wheel is between approximately ½ mm to 2 mm.

4. A vehicle comprising:
    a front axle;
    a rear axle located behind said front axle;
    a front wheel configured to be attached to said front axle of the vehicle; and
    a rear wheel configured to be attached to said rear axle of the vehicle,
    wherein the vehicle is a rear-wheel drive vehicle with front wheel steering,
    wherein the front wheel is greater in rigidity that the rear wheel,
    wherein the front wheel has a rim width that is less than a rim width of the rear wheel, wherein rim width is defined as the maximum axial dimension of an associated rim, and
    wherein the rigidity is defined by the formula:

$K=FS^2/\delta$, where "K" represents rigidity, "F" represents a force applied to a tip portion of a load arm of a stationary member upon which a wheel being tested is attached, "S" represents a distance between a portion of the rim where the stationary member is attached and the tip portion to which the force F is applied, and $\delta$ is the measured angular movement of the load arm.

5. The vehicle according to claim 4, wherein the front wheel and the rear wheel each comprise the following components:
    a disk;
    a rim provided on the outer peripheral edge of the disk; and
    an annular flange provided on each side of said rim,
    wherein said disk, said rim and said annular flanges of said front wheel are the same thicknesses, respectively, as said disk, said rim and said annular flanges of said rear wheel, and
    wherein said disk and said annular flanges of said front wheel are the same sizes, respectively, as said disk and said annular flanges of said rear wheel.

6. The vehicle according to claim 5, wherein a difference between nominal rim widths of the front wheel and rear wheel is between approximately ½ mm to 2 mm.

* * * * *